Nov. 8, 1960 H. GUTTON ET AL 2,959,780
ELECTROMAGNETIC NAVIGATION SYSTEMS
Filed July 9, 1958 2 Sheets-Sheet 1

United States Patent Office 2,959,780
Patented Nov. 8, 1960

2,959,780

ELECTROMAGNETIC NAVIGATION SYSTEMS

Henri Gutton, Henri Familier, and Basile Ginger, all of Paris, France, assignors to Compagnie Generale de Telegraphie Sans Fil, a corporation of France Filed July 9, 1958, Ser. No. 747,382

Claims priority, application France July 12, 1957

3 Claims. (Cl. 343—9)

The present invention relates to electromagnetic navigation systems provided on airships, and, more particularly, to systems for radiating electromagnetic energy to the ground in the form of pulses, receiving echoes resulting from the reflection of said energy from objects existing in a certain region of ground over which the airship is flying, observing the Doppler effect on said echoes due to the speed of the airship and inferring therefrom the desired navigational data such as, for example, horizontal speed and drift.

In conventional systems of this type, the accuracy of this measurement is in inverse proportion to the area covered by the beam on the ground.

In order to reduce this area as much as possible, use is made of the ultra-high frequency waves in the centimetric wave-band, enabling the energy to be concentrated into a beam of a very small angular width or aperture.

This leads to a serious difficulty, since, in order to render the measuring operation independent of the trim of the airship on its flight-path, the aerial mounted on board must be gyroscopically stabilized. This results in a highly complex mechanical equipment and in an increase of weight, which is a serious drawback for navigational apparatus to be carried on airships. Further, the cost is thereby considerably increased.

The present invention has as an object the provision of a navigation system adapted to cope with these disadvantages; the aerials used are simple and rigidly connected to the structure of the airplane and require no rotating mechanical devices.

The delimitation of the area covered for measurement is not obtained by the directivity of the aerials, but by using a range selecting gate or window signal.

The position in time of this gate, which renders the system receiver responsive during very short periods, is tied to flight altitude, so that the angle of incidence of the radius considered remains constant for any position of the airplane on its flight-path. The influence of the trim on speed or drift measurements is thus practically eliminated. It is only necessary that the aperture of the radiated beam be sufficient to provide for all possible positions of the airship.

The invention will be better understood from the following description and appended drawings of a non-limitative embodiment of the invention. In the drawings.

The device according to the invention enables, on one hand, the measuring of the variation of the magnitude of the horizontal speed-vector of the airplane and, on the other hand, the drift, i.e. the angle formed by said vector with a vertical plane in fixed relationship with the airplane and which may be, for instance, the plane of symmetry of the airship.

Figure 1:
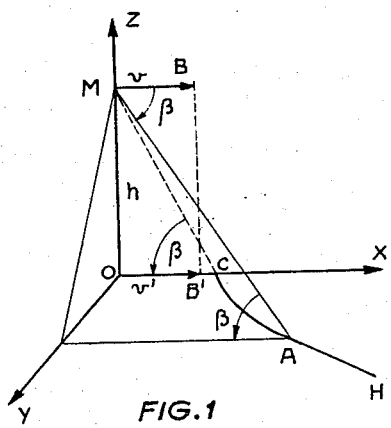
Figs. 1 and 2 illustrate the principle of the invention.

In Fig. 1, point M corresponds to an airplane flying at a speed, the horizontal projection MB of which is equal to $v$. Point O is the vertical projection of M on the ground at a given instant and $v'$ the horizontal projection on the ground of speed $v$. Considering at that instant the reference trihedral defined by axes OX coinciding with $v'$, OZ the vertical from point M and OY the perpendicular to plane XOZ, any point A of plane XOY moves with respect to the ground with a speed opposite and parallel to $v$. The projection of $v$ on MA is equal to $v \cos \beta$, where $\beta$ is the angle BMA.

If the airplane M comprises a radar device transmitting in the direction of ground pulses, the carrier frequency of which is $F_1$, and receiving echoes therefrom, it is known that, to a point such as A, will correspond an echo of a frequency $F_2$ differing from $F_1$ by an amount $d$. The value of this frequency $d$, which is a Doppler frequency, is:

$$d = \frac{2v}{\lambda} \cos \beta$$

wherein $\lambda$ is a wave-length of the transmitted pulses.

Under these conditions, it is readily seen that the locus of the points of plane XOY to which corresponds Doppler frequency $d$ is the locus of the points for which angle $\beta$ is constant. Calculation shows that this locus is an hyperbola of axes OX and OY, one of the summits of which is C, and only a fraction CAH of an arc of which is shown in Fig. 1.

Figure 2:
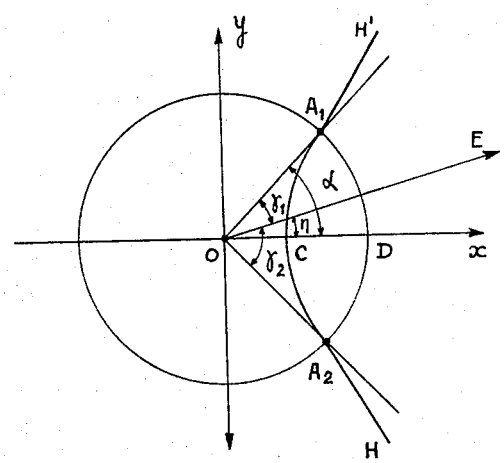

In Fig. 2, the arc of hyperbola HCH' is illustrated, the convex side of which is directed towards the airplane, whose projection on the plane XOY is at O and the horizontal component of the speed vector of which projects on axis O$x$.

According to the invention, there is provided in the receiver a range discrimination gate centered on a length $l$ which defines on the ground a circle of radius OD. This circle crosses the hyperbola arc HCH' at points $A_1$ and $A_2$. This arrangement allows selecting, for measurement purposes, two substantially pin-point regions located at $A_1$ and $A_2$, which reflect onto the receiver echoes the Doppler frequency of which has the same value. Moreover, the arrangement is such that the distance $l$ provided by the gate is constantly connected to the altitude $h$ in such a manner that the ratio $$\frac{l}{h}$$

is constantly equal to a constant K.

Under these conditions, calculation shows that the horizontal speed $v$ of the aircraft is given by the formula:

$$V = \frac{\lambda d}{2 \cos \alpha} \cdot \frac{K}{\sqrt{K^2 - 1}} \qquad (1)$$

where $\alpha$ is angle $A_1 O x$, equal to $A_2 O x$, the other symbols having been defined hereinabove.

Consequently, it is apparent that the measurement of angle $\alpha$ allows the horizontal flight speed of the aircraft to be determined.

On the other hand, if the axis of symmetry of the aircraft projects on OE, angle $\eta = EOX$ represents the drift.

It is thus clearly seen from Fig. 2 that it is merely necessary to measure the angles $\gamma_1$ and $\gamma_2$, i.e. the angular positions of $A_1$ and $A_2$ with respect to the axis of the aircraft in order to dispose of the two data needed by the navigator: horizontal speed and drift.

Actually the drift is given by:

$$\eta = \frac{\gamma_2 - \gamma_1}{2}$$

and angle $\alpha$ by:

$$\alpha = \frac{\gamma_1 + \gamma_2}{2}$$

In fact, the direct measurement of angles $\gamma_1$ and $\gamma_2$ would not be readily available and practically usable.

According to the invention, two base lines are provided on the aircraft. They are symmetrically disposed on both sides of the longitudinal axis of the aircraft, so as to form with said axis a predetermined angle, for instance of 45°, and are defined by aerial elements, such as horns, respectively located at the ends thereof.

These base lines make it possible to determine the respective angular positions of points $A_1$ and $A_2$ by measuring the respective phase-shifts corresponding to the Doppler frequency between the two echo signals reaching the ends of the two base lines from points $A_1$ and $A_2$ respectively.

Assuming, first, that the drift $\eta$ is nil, to a given speed $v_0$ of the aircraft corresponds a Doppler frequency $d_0$ such that the phase-shift between the signals, respectively reflected from $A_1$ or $A_2$ on the corresponding base line, is nil. Referring to Equation 1, the value of this frequency is then:

$$d_0 = \frac{2}{\lambda} v_0 \cdot \cos \alpha_0 \cdot \sqrt{1 - \frac{1}{K^2}} \qquad (2)$$

wherein $\lambda$ = the operating frequency $\alpha_0$ = angle $A_1$ Ox in Fig. 2, i.e. the complementary angle of the pitch angle of the bases on the longitudinal axis of the aircraft, and $K = l/h$ i.e. the distance to the altitude ratio, as mentioned hereinabove.

The speed of the aircraft having been roughly estimated at a value close to $v_0$ by means of a conventional navigational apparatus, the navigator will derive from expression (2) the value $d_0$ of the corresponding Doppler frequency and adjust to this frequency the frequency of a calibrated low frequency filter of a receiver to be described hereinafter.

Calculation will then show that the measurement of phase-shifts $\varphi_1$ and $\varphi_2$ between the signals received at this frequency enables the measurement of the speed variations of the aircraft around the nominal speed $v_0$ which corresponds to a zero phase-shift.

This speed variation is given by the following expression:

$$\frac{\Delta v}{v_0} \cong A(\varphi_1 - \varphi_2) \qquad (3)$$

where A is a constant.

It can also be shown that this relation still holds when the drift $\eta$ is not zero, the values of $\varphi_1$ and $\varphi_2$ varying then by the same quantity.

As to drift $\eta$, calculation shows, that it is given by the following expression:

$$\eta \cong (\varphi_1 + \varphi_2) \cdot B \qquad (4)$$

where B is constant.

Thus, all the measurements necessary for the navigation are reduced to phase-shift measurements between the signals respectively collected by the aerials and respectively defining two base lines, $\varphi_1$ corresponding, for example, to the first of said base lines and $\varphi_2$ to the second.

Figure 3:
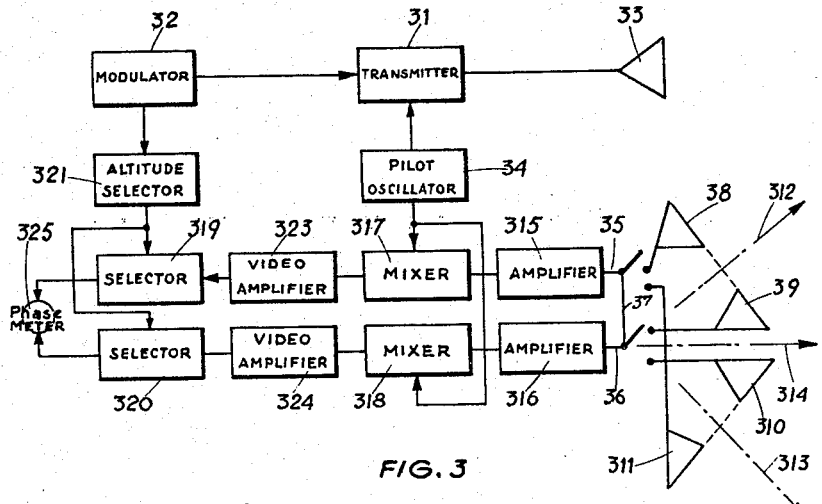
Fig. 3 is a simplified block-diagram of a system according to the invention.

An embodiment of the system according to the invention is illustrated, schematically and by way of a non-limitative example, in Fig. 3. It comprises:

A pulse modulated transmitter 31 comprising a power oscillator; a modulator 32 which pulse modulates transmitter 31 and provides conventional reference pulses to the various radar circuits; an ultra high frequency pilot oscillator 34, adapted to insure the phase synchronization of the transmitted signals and which is also used as the local oscillator of the receiver.

The transmitter radiates forward of the aircraft and in the direction of the ground an electromagnetic energy beam, constituted by ultra high frequency pulses, the aperture of this beam being sufficiently wide for the arc $A_2CA_1$ of the hyperbola (Fig. 2) to be such that angle $\alpha$ is sufficiently great to allow precise measurements. In practice, the value of this angle may be of about 45°, for instance.

It is obvious that many radiating diagrams can be utilized, according to known art, without departing from the spirit of the invention. Thus, any radiating pattern defining, on the ground, regions containing $A_1$ and $A_2$ will be suitable. More particularly and in order to save energy or increase the range, the pattern may comprise two lobes symmetric with respect to the axis of the aircraft and respectively covering, on the ground, regions $A_1$ and $A_2$.

As to reception, and in order to provide the double measurement of angular variation as mentioned hereinabove, two base lines, each comprising two distinct aerials are necessary; these aerials are respectively connected to independent reception channels, thus requiring the use of four reception channels.

However, according to the particular embodiment hereinafter described, the equipment is simplified by using only two reception channels 35 and 36 which are alternately coupled to the two pairs of aerials by means of a commutator 37.

In Fig. 3, the two base lines are respectively defined by identical pairs of aerials 38, 39 and 310, 311, the general orientation of which is represented by arrows 312 and 313, these base lines being symmetrically located with respect to the axis of the airship shown by arrow 314, the measure consisting in determining $\varphi_1$ which is, for example, the phase shift between the incident signals respectively received by the aerials 38 and 39 and $\varphi_2$ that between the signals incident on the aerials 310 and 311.

The field pattern corresponding to each one of these base lines is constituted by a beam directed onto the ground and oriented for the echoes derived from regions $A_1$ or $A_2$ to be collected.

The receiver thus comprises only two independent channels 35 and 36. Each channel essentially comprises an amplification chain, 315 or 316, and a mixer, 317 or 318, using as local oscillation the oscillation provided by pilot stage 34 which simultaneously synchronizes the transmitter.

At the output of the mixer, the video signal is collected under the shape of successive pulses the envelope, of which is amplitude modulated at the Doppler frequency.

Video-frequency amplifiers 323 or 324, are followed by a selector, 319 or 320, unblocked by a range-discriminating gate signal obtained from an altitude selector device 321 to be described presently.

This selector comprises a filter eliminating the frequency corresponding to the pulse recurrence frequency. It also essentially comprises a low-frequency band-pass filter, the tuning frequency of which may be readily tuned to a predetermined Doppler frequency.

Finally, a phase meter 325 enables the comparison of the phases of the Doppler frequency signals collected in each channel. It provides signals feeding the navigational indicating apparatus on the dials of which are thus permanently inscribed the speed and the drift.

The operation of the device for the control of the discriminating gate signals will now be described:

As mentioned above and according to the invention, the range discriminating gate or window must be permanently tied to the altitude of the aircraft so as to provide the relation $l = Kh$, K being a constant. It is therefore necessary, in order to realize this condition, to measure permanently the altitude $h$ of the aircraft and to control as a function of this altitude the position in time of the receiver controlling gate so as to maintain constant the ratio $l/h$.

Figure 4:
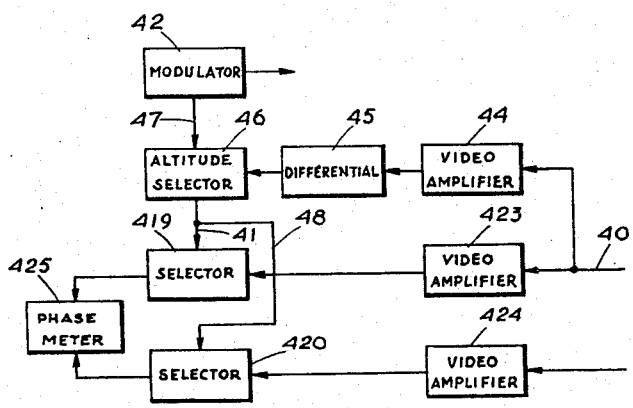
Fig. 4 is a block-diagram of a portion of the system of Fig. 3.

A particular embodiment of the device achieving this result is shown in Fig. 4.

The figure illustrates the reception channels in greater detail and starting from mixer 317 or 318 (Fig. 3) the output of which is shown in 40 in Fig. 4.

The normal video-frequency channels of the receiver are represented by amplifiers 423 and 424 and selectors 419 and 420 feeding phasemeter 425.

An auxiliary channel, adapted to measure the altitude, is provided in parallel with this normal channel. It comprises, for instance, a video-frequency amplifier 44, similar to amplifier 423 of the normal chain. This amplifier 44 is followed by a differentiating circuit 45 enabling discriminating the front of the incident echo signal from the ground, thus measuring the time separating the transmission of a pulse from the reception of the echo along the vertical axis of the aircraft.

Figure 5:
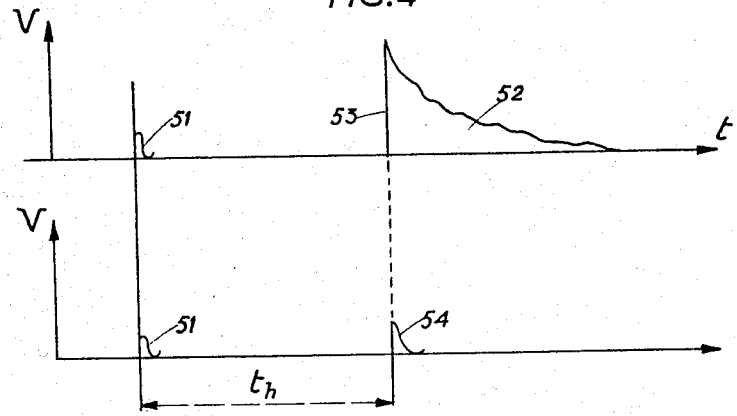
Fig. 5 illustrates the principle of an auxiliary device for altitude measurement.

This device is well known in the art and will be described only briefy with reference to Fig. 5, illustrating the amplitudes V of the signals as a function of time $t$. Upon the transmission of a pulse to which corresponds in the receiver pulse 51, shown in Fig. 5, the ground reflects back to the radar receiver a complex echo signal having roughly the shape of signal 52. It is obvious that the time $t_h$, which elapses between the transmission of the pulse and the front 53 of the echo signal 52, corresponds to the shortest possible path between the aircraft and ground i.e. to the altitude. It will thus suffice to differentiate signal 52 in order to obtain at 54 a pulse, separated from the transmission pulse by a time $t_h$ proportional to the altitude. This signal 54, provided by the differentiating circuit 45 (Fig. 4), is then applied to the altitude selector 46 which receives, on the other hand, at 47, the general radar synchronizing signal provided by the transmission modulator 42. Thus, a signal is obtained at the output of selector 46, the voltage of which is proportional to time $t_h$, i.e. to the altitude. A conventional circuit arrangement such as a simple potentiometric circuit, for instance, thus enables permanently applying to this voltage the proportionality constant K mentioned above and which, according to the invention, must connect the altitude $h$ and the distance $l$, according to the relations:

$$K = l/h$$

This voltage thus modified is applied at 41 and 48 to the selectors of the normal channels which thus are made responsive only to signals derived from predetermined regions $A_1$ and $A_2$ which are used for measurements.

The output signals of the normal channels are fed to phase-meter 425 in Fig. 4.

It will be appreciated that a voltage is thus provided for controlling the discriminating gates for the main chains of the receiver and that the constancy of ratio $l/h$ is thus obtained in a simple manner.

Figure 6:
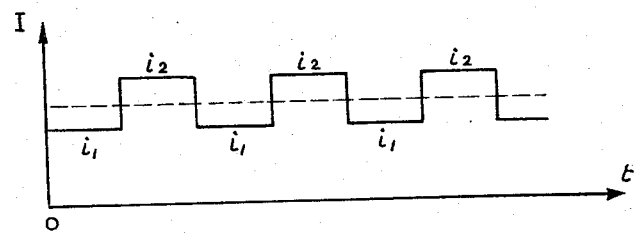
Fig. 6 is a curve showing the shape of the output signal of the receiver used in the system of the invention.

As to the signal finally provided by the receiver and which is a function of the phase-shifts observed on the two base lines it has the general shape shown in Fig. 6 which illustrates the intensity I of the output signal plotted against time $t$.

This signal is formed by currents $i_1$ and $i_2$ proportional to phase-shifts $\varphi_1$ and $\varphi_2$ of the incident signals received respectively and alternately of both bases. From expressions (3) and (4), the continuous component, the amplitude of which is represented by the dotted line, is equal to $$\frac{i_1+i_2}{2}$$

provides permanently a magnitude proportional to the drift, since it is proportional to the quantity $(\varphi_1+\varphi_2)$, whereas the amplitude of the alternative component, which is equal to $$\frac{i_1-i_2}{2}$$

provides simultaneously a magnitude proportional to the speed variation, since it is proportional to the quantity $(\varphi_1-\varphi_2)$.

These two components are readily separated by filtering, according to known art, for feeding the corresponding navigational apparatus.

In brief, the operations incumbent to the navigator consist simply in roughly estimating the speed of his aircraft by means of any conventional navigational method and in tuning the low-frequency, previously calibrated, band-pass filter of the receiver to the Doppler frequency corresponding to this speed.

The board instruments will then permanently provide the horizontal speed and the drift of the aircraft.

As concerns the influence of a ground having a certain relief, calculation shows that the measurement errors of speed and drift decrease with the square of the trigonometrical tangent of angle $\beta$. The constant $$K = \frac{l}{h} = \frac{1}{\sin \beta}$$

will be given a maximum value consistent with the range of the equipment.

It is to be understood that the invention is in no way limited by the embodiments described and illustrated by way of example.

What is claimed is:

1. A navigational high-frequency pulse modulated airship radar using the Doppler effect on ground echoes for measuring the horizontal speed and the drift of the airship, comprising: transmitting means for radiating pulse modulated signals in a forward and downward direction; two pairs of aerials, respectively defining two phase-shift measuring base lines rigidly secured to said airship symmetrical with respect to the axis of said airship, for receiving respectively from the ground echoes of said signals; two receiver means coupled to said aerials comprising frequency selective means for tuning said receiver to a predetermined Doppler frequency, said receiver having an output; means coupled to said output for alternately measuring the phase-shifts occurring between the signals respectively received by the two aerials defining each of said base lines; means for providing gate signals shifted in time with respect to said pulse signals as a function of the altitude of said airship; and means for controlling said receiver output by means of said gate signals.

2. A navigational high-frequency pulse modulated airship radar using the Doppler effect on ground echoes for measuring the horizontal speed and the drift of the airship, comprising: transmitting means for radiating pulse modulated signals in a forward and downward direction; a local oscillator providing a local oscillation frequency controlling said transmitter; two pairs of aerials, respectively defining two phase-shift measuring base lines, rigidly secured to said airship symmetrical with respect to the axis of said airship, for receiving respectively from the ground echoes of said signals; two receiver channels; means for alternately coupling said two channels to said pairs of aerials; each of said channels comprising amplifying means, means for mixing said oscillation with said echoes and frequency selective means for tuning said receiver to a predetermined Doppler frequency, said receiver having an output; means coupled to said output for alternately measuring the phase-shifts occurring between the signals respectively received by two aerials defining each of said base lines; means for providing gate signals shifted in time with respect to said pulse signals as a function of the altitude of said airship;

and means for controlling said receiver output by means of said gate signals.

3. A navigational high-frequency pulse modulated airship radar using the Doppler effect on ground echoes for measuring the horizontal speed and the drift of the airship, comprising: transmitting means for radiating pulse modulated signals in a forward and downward direction; a local oscillator providing a local oscillation for frequency controlling said transmitter; two pairs of aerials, respectively defining two phase-shift measuring base lines, rigidly secured to said airship symmetrical with respect to the axis of said airship for receiving respectively from the ground echoes of said signals; two receiver channels; means for alternately coupling said two channels to said pairs of aerials, each of said channels comprising amplifying means, means for mixing said oscillation with said echoes and frequency selective means for tuning said receiver to a predetermined Doppler frequency, said receiver having an output; means coupled to said output for alternately measuring the phase-shifts occurring between the signals respectively received by the two aerials defining each of said base lines; a further channel, coupled to one of said channels and comprising in series video amplifying means and a differentiator for providing gate signals shifted in time with respect to said pulse signals as a function of the altitude of said airship; and means for controlling said receiver output by means of said gate signals.

References Cited in the file of this patent

UNITED STATES PATENTS 2,869,117     Berger _____ Dec. 23, 1958